(12) United States Patent
Cheng et al.

(10) Patent No.: US 11,315,264 B2
(45) Date of Patent: Apr. 26, 2022

(54) LASER SENSOR-BASED MAP GENERATION

(71) Applicant: Beijing Sankuai Online Technology Co., Ltd, Beijing (CN)

(72) Inventors: Baoshan Cheng, Beijing (CN); Hao Shen, Beijing (CN); Liliang Hao, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 0 days.

(21) Appl. No.: 17/044,317

(22) PCT Filed: Dec. 14, 2018

(86) PCT No.: PCT/CN2018/121051
§ 371 (c)(1),
(2) Date: Sep. 30, 2020

(87) PCT Pub. No.: WO2019/196476
PCT Pub. Date: Oct. 17, 2019

(65) Prior Publication Data
US 2021/0082132 A1 Mar. 18, 2021

(30) Foreign Application Priority Data
Apr. 9, 2018 (CN) .......................... 201810312694.0

(51) Int. Cl.
*G06T 7/33* (2017.01)
*G06K 9/62* (2022.01)

(52) U.S. Cl.
CPC .............. *G06T 7/33* (2017.01); *G06K 9/6288* (2013.01); *G06T 2207/10028* (2013.01)

(58) Field of Classification Search
CPC ............. G06T 7/33; G06T 2207/10028; G06T 2210/56; G06T 17/05; G06T 2207/30244;
(Continued)

(56) References Cited

U.S. PATENT DOCUMENTS

| 2012/0197439 A1 | 8/2012 | Wang et al. |
| 2017/0352275 A1 | 12/2017 | Maruyama et al. |
| 2018/0003822 A1 | 1/2018 | Li et al. |

FOREIGN PATENT DOCUMENTS

| CN | 103884330 A | 6/2014 |
| CN | 104574387 A | 4/2015 |

(Continued)

OTHER PUBLICATIONS

State Intellectual Property Office of the People's Republic of China, Office Action and Search Report Issued in Application No. 2018103126940, dated Feb. 19, 2019, 11 pages, (Submitted with Machine Translation).
(Continued)

*Primary Examiner* — Amandeep Saini
(74) *Attorney, Agent, or Firm* — Kilpatrick Townsend & Stockton LLP (57) ABSTRACT

The present disclosure provides a laser sensor-based map generation method. In an embodiment, the method includes: obtaining image data, the image data being acquired by a visual sensor; determining first point cloud data belonging to glass-like region in laser data based on the image data; adjusting a weight of the laser data according to the first point cloud data; fusing the first point cloud data and second point cloud data belonging to non-glass-like region in the laser data based on the adjusted weight of the laser data, to generate a map.

13 Claims, 6 Drawing Sheets

(58) Field of Classification Search
CPC ............. G06K 9/6288; G06K 9/00664; G06K 9/6211; G01S 17/86; G01S 17/89; G05D 1/024; G05D 1/0274
USPC ........................................................ 382/103
See application file for complete search history.

(56) References Cited

FOREIGN PATENT DOCUMENTS

| | | | | |
|---|---|---|---|---|
| CN | 104916216 | A | | 9/2015 |
| CN | 105136155 | A | | 12/2015 |
| CN | 106092104 | A | | 11/2016 |
| CN | 106813672 | A | | 6/2017 |
| CN | 107472135 | A | | 12/2017 |
| CN | 107703935 | A | * | 2/2018 |
| CN | 107703935 | A | | 2/2018 |
| CN | 107860390 | A | | 3/2018 |
| CN | 108665541 | A | | 10/2018 |
| EP | 3264367 | A2 | * | 1/2018 ............. G06T 5/005 |
| EP | 3264367 | A2 | | 1/2018 |

OTHER PUBLICATIONS

ISA State Intellectual Property Office of the People's Republic of China, International Search Report Issued in Application No. PCT/CN2018/121051, dated Mar. 13, 2019, WIPO, 4 pages.

Yang wei "Simultaneous Localization and Mapping Technology Based On Lidar",Dissertation for the Master Degree in Engineering, Classified Index: TP242.6, U.D.C: 621.586.4, Feb. 15, 2018, 72 pages.

European Patent Office, Extended European Search Report Issued in Application No. 18914482.7, dated Apr. 23, 2021, Germany, 15 pages.

ISA State Intellectual Property Office of the People's Republic of China, Written Opinion of the International Searching Authority Issued in Application No. PCT/CN2018/121051, dated Mar. 13, 2019, WIPO, 11 pages.

Zhang Fang et al:"The Application of Multi-sensor information Fusion by Improved Trust Degree on SLAW", 2013 5th International Conference on Intelligent Human-Machine Systems and Cybernetics, IEEE, vol. 1, Aug. 26, 2013.

* cited by examiner

LASER SENSOR-BASED MAP GENERATION

CROSS-REFERENCE TO RELATED APPLICATIONS

This patent application is a National Stage of International Application No. PCT/CN2018/121051 filed on Dec. 14, 2018 which claims priority to Chinese Patent Application No. 201810312694.0, entitled "laser sensor-based map generation method and apparatus and robot" and filed on Apr. 9, 2018, both of which are incorporated by reference herein in their entireties.

TECHNICAL FIELD

The present disclosure relates to laser sensor-based map generation.

BACKGROUND

With the development of computer technologies and artificial intelligence (AI), intelligent mobile robots become an important research direction and research focus of the field of robotics. Localization and map creation of mobile robots are hot research problems in the field of mobile robots.

Currently, a laser sensor may be used to measure environmental data around an object, and simultaneous localization and mapping (SLAM) calculation is performed based on the measured environmental data to create a map. However, a current laser sensor cannot recognize glass, leading to restrictions to SLAM during use.

SUMMARY

In view of this, the present disclosure provides a laser sensor-based map generation method and apparatus, a mobile device, and a computer-readable storage medium.

According to a first aspect of the embodiments of the present disclosure, a laser sensor-based map generation method is provided, including:

acquiring image data, the image data being acquired by a visual sensor;

determining first point cloud data belonging to glass-like region in laser data based on the image data, the laser data being acquired by a laser sensor, the laser data and the image data corresponding to one same region, a time period in which the visual sensor acquires the image data being the same as a time period in which the laser sensor acquires the laser data;

adjusting a weight of the laser data according to the first point cloud data; and fusing the first point cloud data and second point cloud data belonging to non-glass-like region in the laser data based on the adjusted weight of the laser data, to generate a map.

According to a second aspect of the embodiments of the present disclosure, a laser sensor-based map generation apparatus is provided, including:

an acquisition module, configured to acquire image data, the image data being acquired by a visual sensor;

a determination module, configured to determine first point cloud data belonging to glass-like region in laser data based on the image data, the laser data being acquired by a laser sensor, the laser data and the image data corresponding to one same region, a time period in which the visual sensor acquires the image data being the same as a time period in which the laser sensor acquires the laser data;

an adjustment module, configured to adjust a weight of the laser data according to the first point cloud data; and a processing module, configured to fuse the first point cloud data and second point cloud data belonging to non-glass-like region in the laser data based on the adjusted weight of the laser data, to generate a map.

According to a third aspect of the embodiments of the present disclosure, a computer-readable storage medium is provided, storing a computer program, the computer program, when invoked by a processor, causing the processor to perform the laser sensor-based map generation method.

According to a fourth aspect of the embodiments of the present disclosure, a mobile device is provided, including a visual sensor, a laser sensor, a processor, a memory, and a computer program stored in the memory and run on the processor, the processor, when executing the computer program, implementing the laser sensor-based map generation method.

In the laser sensor-based map generation method, a weight of the laser data is adjusted according to first point cloud data, and the first point cloud data and second point cloud data belonging to non-glass-like region in the laser data are then fused based on the adjusted weight of the laser data, to generate a map. In this method, the first point cloud data with a small weight may appear in fused map data at an extremely small probability, thereby improving the precision of the generated map and providing high usability.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated into the specification and constitute a part of this specification, illustrate embodiments consistent with the present disclosure and, together with the specification, serve to explain the principles of the present disclosure.

DETAILED DESCRIPTION OF THE EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

The terms used in the present disclosure are merely for the purpose of illustrating specific embodiments, and are not intended to limit the present disclosure. The terms "a", "an", "said", and "the" of singular forms used in the present disclosure and the appended claims thereof are also intended to include plural forms, unless otherwise specified in the context clearly. It should also be understood that, the term "and/or" used herein indicates and includes any or all possible combinations of one or more associated listed items.

It should be understood that although the terms such as "first", "second", and "third" may be used herein to describe various information, such information should not be limited to these terms. These terms are merely used for distinguishing information of the same type from each other. For example, within the scope of the present disclosure, first information may also be referred to as second information, and similarly, second information may also be referred to as first information. Depending on the context, the term "if" as used herein may be interpreted as "when . . . " or "upon . . . " or "in response to determining".

Figure 1:
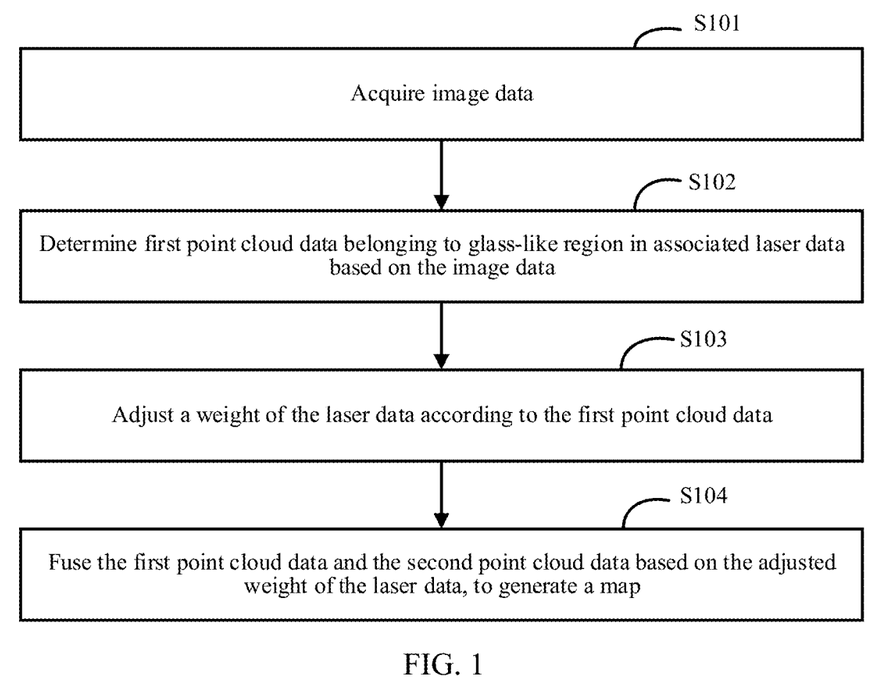
FIG. 1 is a flowchart of a laser sensor-based map generation method according to an exemplary embodiment of the present disclosure.

When a map is generated based on a laser sensor, the laser sensor cannot detect a glass-like region. That is, it is difficult for the laser sensor to create a map of an environment with a glass-like region. In view of this, the present disclosure provides a method of generating a map based on a laser sensor and a visual sensor. This method may be applied to a mobile device having a visual sensor (for example, a camera) and a laser sensor. The mobile device may include, but is not limited to, an unmanned vehicle and a robot. The method may be alternatively applied to a server, the mobile device transmits acquired data to the server, and the server generates a map based on the data acquired by the mobile device and transmits the map to the mobile device. As shown in FIG. 1, the method includes steps S101 to S104:

Step S101. Acquire image data, the image data being acquired by a visual sensor.

The image data may be acquired through a visual sensor on a mobile device, or the image data may be acquired through another visual sensor, and the acquired image data is then transmitted to the mobile device.

Step S102. Determine first point cloud data belonging to glass-like region in laser data based on the image data. The laser data is acquired through a laser sensor, the laser data and the image data correspond to one same region, and a time period in which the visual sensor acquires the image data is the same as a time period in which the laser sensor acquires the laser data.

The glass-like region includes a region that is formed by a transparent material and cannot be detected by the laser sensor but can be shot by the visual sensor. Since the visual sensor can shoot a glass-like region, the first point cloud data belonging to glass-like region in the laser data can be determined based on the image data.

When the image data and the laser data correspond to one same shooting region, and a time period in which the visual sensor acquires the image data is the same as a time period in which the laser sensor acquires the laser data, the laser data is referred to as associated laser data of the image data. For example, image data and laser data of a region 1 that are respectively shot by the visual sensor and the laser sensor at a time period of Beijing time 12:00 to 12:01 may be referred to as associated data. The division of a specific time period and the division of the region 1 may be set according to a device condition, a network condition, environmental complexity of a shooting region, and the like, and is not specifically limited herein.

First point cloud data belonging to glass-like region in the associated laser data is determined based on the image data, real-time detection of a glass-like region can be implemented.

Figure 2A:
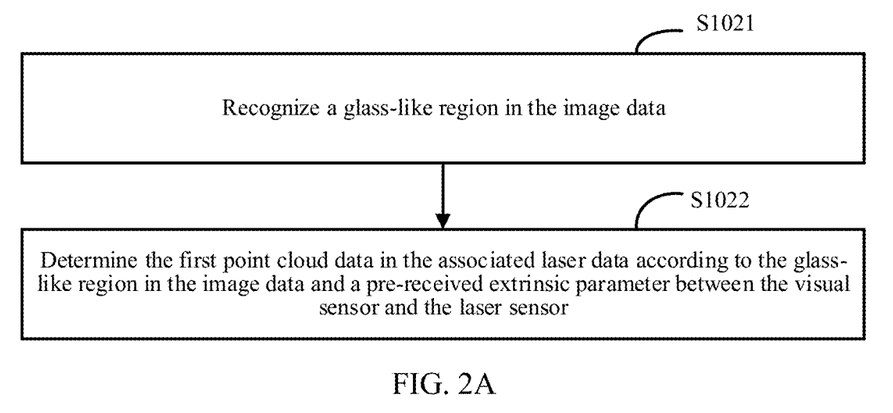
FIG. 2A is a flowchart of a method of determining point cloud data belonging to glass-like region in associated laser data based on image data according to an exemplary embodiment of the present disclosure.
Figure 2B:
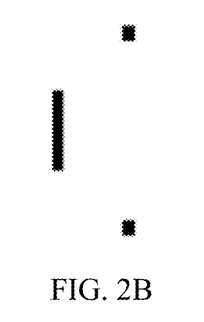
FIG. 2B is a schematic diagram of a pattern corresponding to a glass-like region according to an exemplary embodiment of the present disclosure.
Figure 2C:
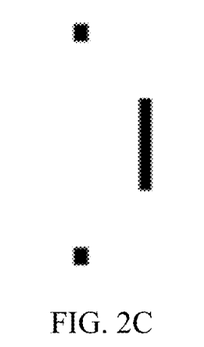
FIG. 2C is a schematic diagram of a pattern corresponding to a glass-like region according to another exemplary embodiment of the present disclosure.
Figure 2D:
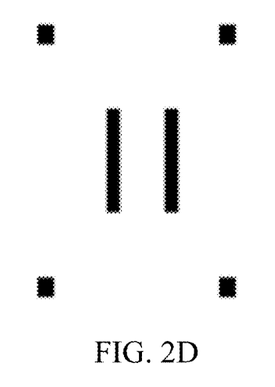
FIG. 2D is a schematic diagram of a pattern corresponding to a glass-like region according to still another exemplary embodiment of the present disclosure.

As shown in FIG. 2A, determining first point cloud data belonging to glass-like region in laser data based on the image data may include steps S1021 and S1022:

Step S1021. Recognize a glass-like region in the image data.

In an embodiment, recognizing a glass-like region in the image data includes: segmenting an image corresponding to the image data into a plurality of subimages; determining, according to one recognition model or a plurality of pre-trained recognition models, whether each subimage belongs to glass-like region; and determining the glass-like region in the image data according to subimages belonging to glass-like region.

The mobile device or the server may obtain a training picture set, obtain one or more recognition models through training by using a convolutional neural network (CNN) (a faster R-CNN), and then detect the glass-like region in the image data by using the one recognition model or the plurality of recognition models.

In an embodiment, determining, according to one pre-trained recognition model, whether each subimage belongs to glass-like region may include: inputting the subimage into the recognition model, to obtain a probability of determining, based on the recognition model, that the subimage belongs to glass-like region; determining, if the probability of determining, based on the recognition model, that the subimage belongs to a glass-like region is greater than a probability threshold corresponding to the recognition model, that the subimage belongs to a glass-like region; and determining, if the probability of determining, based on the recognition model, that the subimage belongs to a glass-like region is less than or equal to the probability threshold corresponding to the recognition model, that the subimage belongs to non-glass-like region.

In an embodiment, the image corresponding to the image data may be segmented into a plurality of subimages according to a segmentation manner used to train the recognition model, and each subimage is inputted into the recognition model, to obtain a probability of determining, based on the recognition model, that the subimage belongs to a glass-like region.

Figure 2E:
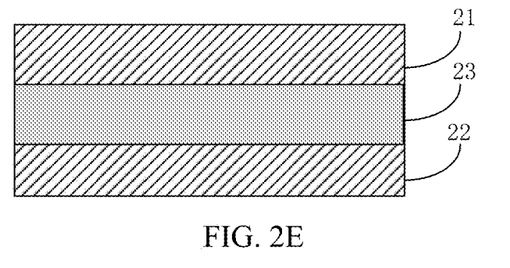
FIG. 2E is a schematic diagram of a pattern corresponding to a glass-like region according to yet another exemplary embodiment of the present disclosure.

FIG. 2B to FIG. 2E respectively represent patterns corresponding to glass-like regions. In FIG. 2E, a region 21 and a region 22 respectively represent the upper part and the lower part of a scene, and a region 23 represents the middle part of the scene and the region may be a frosted glass-like region or a glass-like region bonded with a thin film. The region 21 and the region 22 are separated by the region 23. Assuming that a subimage 3, a subimage 4, a subimage 5, and a subimage 6 of an image all include the pattern shown in FIG. 2C, it may be determined that a region formed by the subimage 3, the subimage 4, the subimage 5, and the subimage 6 is a glass-like region in the image data.

In an embodiment, a plurality of recognition models are pre-trained, and determining, according to the plurality of recognition models, whether the subimage belongs to glass-like region includes: inputting the subimage into every recognition model, to obtain a probability of determining, based on the recognition model, that the subimage belongs to glass-like region; and determining, when the probability of determining, based on every recognition model, that the subimage belongs to glass-like region is greater than a probability threshold corresponding to the recognition model, that the subimage belongs to glass-like region. In this case, since the probability of determining, based on every recognition model, that the subimage belongs to glass-like region is greater than the probability threshold corresponding to the recognition model, the obtained glass-like region is more accurate.

Determining the glass-like region in the image data according to subimages belonging to glass-like region includes: using the union (i.e., combination) of the subimages belonging to glass-like region as the glass-like region in the image data. The glass-like region obtained in this way is more accurate.

Figure 2F:
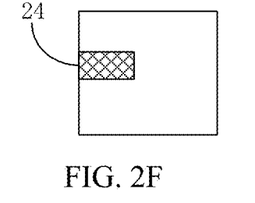
FIG. 2F is a schematic diagram of a glass-like region in a current image recognized by a first recognition model according to an exemplary embodiment of the present disclosure.
Figure 2G:
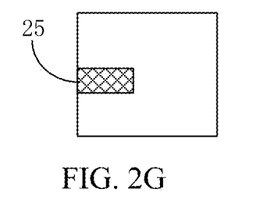
FIG. 2G is a schematic diagram of a glass-like region in a current image recognized by a second recognition model according to another exemplary embodiment of the present disclosure.
Figure 2H:
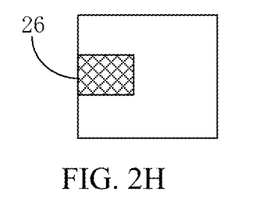
FIG. 2H is a schematic diagram of a glass-like region in a current image based on FIG. 2F and FIG. 2G.

Assuming that a probability of determining, based on a recognition model, that the subimage belongs to glass-like region is greater than a probability threshold corresponding to the recognition model, the recognized glass-like region may be used as the glass-like region in the image data. For example, FIG. 2F shows a glass-like region 24 recognized by a first recognition model in a current image, and FIG. 2G shows a glass-like region 25 recognized by a second recognition model in the current image. In this case, as shown in FIG. 2H, the union of the glass-like region 24 and the glass-like region 25, that is, a glass-like region 26 may then be used as the glass-like region of the image.

Assuming that the probability of determining, based on every recognition model of the plurality of recognition models, that the subimage belongs to glass-like region is greater than the probability threshold corresponding to the recognition model, the recognized glass-like region may be used as the glass-like region in the image data. For example, when a probability of determining, based on the first recognition model, that the subimage belongs to glass-like region is greater than a probability threshold corresponding to the first recognition model and a probability of determining, based on the second recognition model, that the subimage belongs to glass-like region is greater than a probability threshold corresponding to the second recognition model, it is determined that the subimage belongs to glass-like region. In this way, the obtained glass-like region is more accurate. Alternatively, if a probability of determining, based on any recognition model, that a subimage belongs to glass-like region is greater than a probability threshold corresponding to the recognition model, it is determined that the subimage belongs to glass-like region. In this way, all glass-like regions are obtained.

Step S1022. Determine the first point cloud data in the associated laser data according to the glass-like region in the image data and a pre-received extrinsic parameter between the visual sensor and the laser sensor.

The extrinsic parameter may be manually calibrated by a toolbox based on robust automatic detection in laser of calibration chessboards (RADLOCC) and inputted into the mobile device.

The extrinsic parameter is a parameter indicating a spatial rotation and translation relationship between a coordinate system in which the visual sensor is located and a coordinate system in which the laser sensor is located. A representation form of the extrinsic parameter may be a 3*3 rotation matrix and a 3*1 translation vector or may be a 4*1 quaternion vector and a 3*1 translation vector.

The first point cloud data belonging to glass-like region in the associated laser data is determined according to the glass-like region in the image data and the pre-received extrinsic parameter between the visual sensor and the laser sensor. In this way, the workload of manually modifying glass walls can be effectively reduced, and the generation efficiency of a map can be improved.

Step S103. Adjust a weight of the laser data according to the first point cloud data.

Adjusting a weight of the laser data according to the first point cloud data includes any one or more of the following: decreasing a first weight corresponding to the first point cloud data; and increasing a second weight corresponding to second point cloud data belonging to non-glass-like region in the laser data.

In this embodiment, the first weight corresponding to the first point cloud data may be decreased, or the second weight corresponding to the second point cloud data may be increased, or the first weight corresponding to the first point cloud data may be decreased and the second weight corresponding to the second point cloud data may be increased.

Figure 3A:
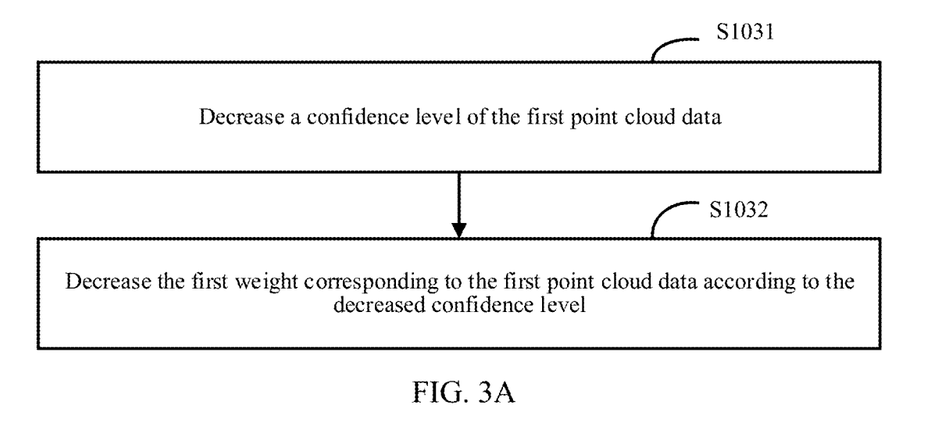
FIG. 3A is a flowchart of a method of decreasing a first weight corresponding to first point cloud data according to an exemplary embodiment of the present disclosure.

Description is still provided with reference to FIG. 1. As shown in FIG. 3A, decreasing a first weight corresponding to the first point cloud data may include steps S1031 and S1032:

Step S1031. Decrease a confidence level of the first point cloud data.

The accuracy of the first point cloud data is relatively low, so that the confidence level of the first point cloud data can be decreased to improve the precision of a generated map.

For example, the confidence level of the first point cloud data may be decreased to 0 to 0.1.

Step S1032. Decrease the first weight corresponding to the first point cloud data according to the decreased confidence level.

The first weight corresponding to the first point cloud data may be decreased according to the decreased confidence level. That is, the decreased first weight is related to the decreased confidence level. For example, if the decreased confidence level is 0, the first weight may be decreased to 0.01 or 0. It should be noted that, 0.01 or 0 is merely an example, and the first weight may be adjusted as required during actual application.

Figure 3B:
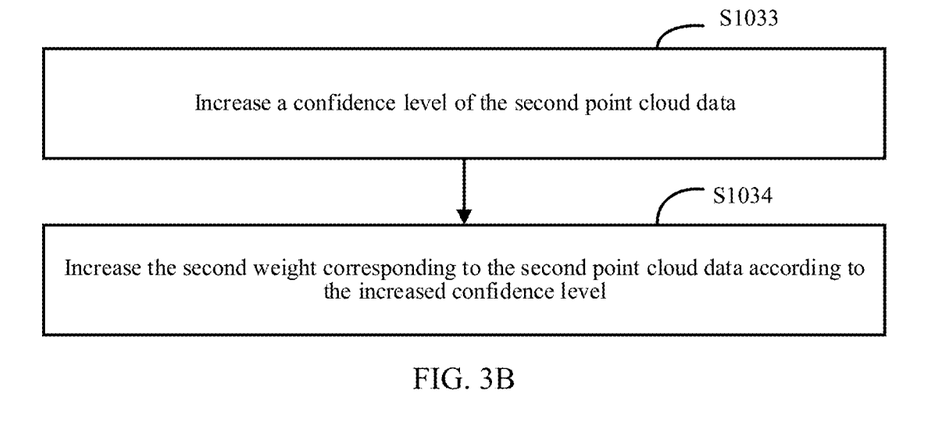
FIG. 3B is a flowchart of a method of increasing a second weight corresponding to second point cloud data according to an exemplary embodiment of the present disclosure.

Description is still provided with reference to FIG. 1. As shown in FIG. 3B, increasing a second weight corresponding to second point cloud data includes steps S1033 and S1034.

Step S1033. Increase a confidence level of the second point cloud data.

The accuracy of the second point cloud data is relatively high, so that the confidence level of the second point cloud data may be increased to improve the precision of a generated map.

For example, the confidence level of the second point cloud data may be increased to 0.9 to 1.

Step S1034. Increase the second weight corresponding to the second point cloud data according to the increased confidence level.

The second weight corresponding to the second point cloud data may be increased according to the increased confidence level. That is, the increased second weight is related to the increased confidence level. For example, if the increased confidence level is 0.9, the second weight may be increased to 0.99 or 1. It should be noted that, 0.99 or 1 is merely an example, and the second weight may be adjusted as required during actual application.

The first weight corresponding to the first point cloud data is decreased according to the decreased confidence level, and the second weight corresponding to the second point cloud data is increased according to the increased confidence level, thereby providing a condition for subsequent fusing performed on the associated laser data based on an adjusted weight, that is, providing a condition for generating map data with high precision.

Step S104. Fuse the first point cloud data and the second point cloud data based on the adjusted weight of the laser data, to generate a map.

Description is still provided with reference to FIG. 1. For example, the mobile device may fuse the first point cloud data and the second point cloud data based on the adjusted weight of the laser data, to obtain an initial map, and then optimize the initial map to generate a map. For example, the mobile device may generate the map after performing loop closure detection and optimization on the initial map, to further improve the precision of a generated map.

Figure 4:
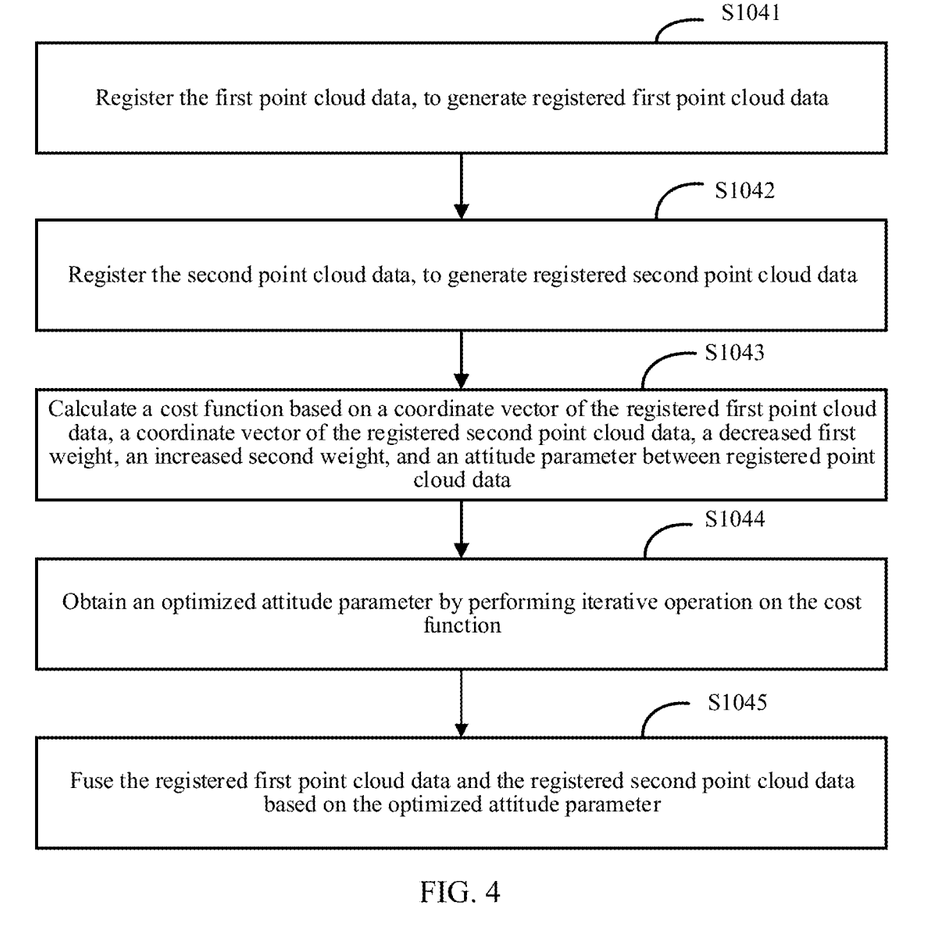
FIG. 4 is a flowchart of a method of fusing first point cloud data and second point cloud data based on an adjusted weight of laser data according to an exemplary embodiment of the present disclosure.

In this embodiment, as shown in FIG. 4, fusing the first point cloud data and the second point cloud data based on the adjusted weight of the laser data may include the following steps:

Step S1041. Register the first point cloud data, to generate registered first point cloud data.

Step S1042. Register the second point cloud data, to generate registered second point cloud data.

Step S1043. Calculate a cost function based on a coordinate vector of the registered first point cloud data, a coordinate vector of the registered second point cloud data, a decreased first weight, an increased second weight, and an attitude parameter between the registered point cloud data.

Assuming that point cloud data m_i registers with point cloud data n_i, where i represents a point index, the cost function is Formula (1):

$$F\_cost = \Sigma Wi^*(Xn\_i - (R(Xm\_i) + t)) \quad (1)$$

Xm_i and Xn_i represent coordinate vectors (x,y,z) of the registered point cloud data, and Wi is a weight corresponding to the registered point cloud data. If the registered point cloud data is located in a glass-like region, namely, the registered first point cloud data, Wi represents the decreased first weight, for example, 0. If the registered point cloud data is located in a non-glass-like region, namely, the registered second point cloud data, Wi represents the increased second weight, for example, 1. R and t represent attitude parameters between the registered point cloud data. For example, R represents a rotation change matrix from Xm to Xn, and t represents a displacement change vector from Xm to Xn.

Step S1044. Obtain an optimized attitude parameter by performing iterative operation on the cost function.

In this embodiment, estimated values of R and t may be obtained by using an encoder sensor of the mobile device. Derivation operation is then performed on R and t through F_cost, to perform continuous iteration by using a gradient descent method, iterations are stopped when a difference change between values of F_cost is relatively small after two iterations, and R' and t' obtained in this case are the optimized attitude parameters.

Step S1045. Fuse the registered first point cloud data and the registered second point cloud data based on the optimized attitude parameter.

After the optimized attitude parameter is obtained, the registered first point cloud data and the registered second point cloud data may be fused based on the optimized attitude parameter.

In this embodiment, the optimized attitude parameter is obtained based on the cost function, and the registered first point cloud data and the registered second point cloud data are fused based on the optimized attitude parameter, which is a simple implementation.

The first point cloud data and the second point cloud data are fused based on the adjusted weight, so that the first point cloud data with a small weight may appear in fused map data at an extremely small probability, thereby improving the precision of the generated map and providing high usability.

Corresponding to the embodiment of the laser sensor-based map generation method, the present disclosure further provides an embodiment of a laser sensor-based map generation apparatus.

Figure 5:
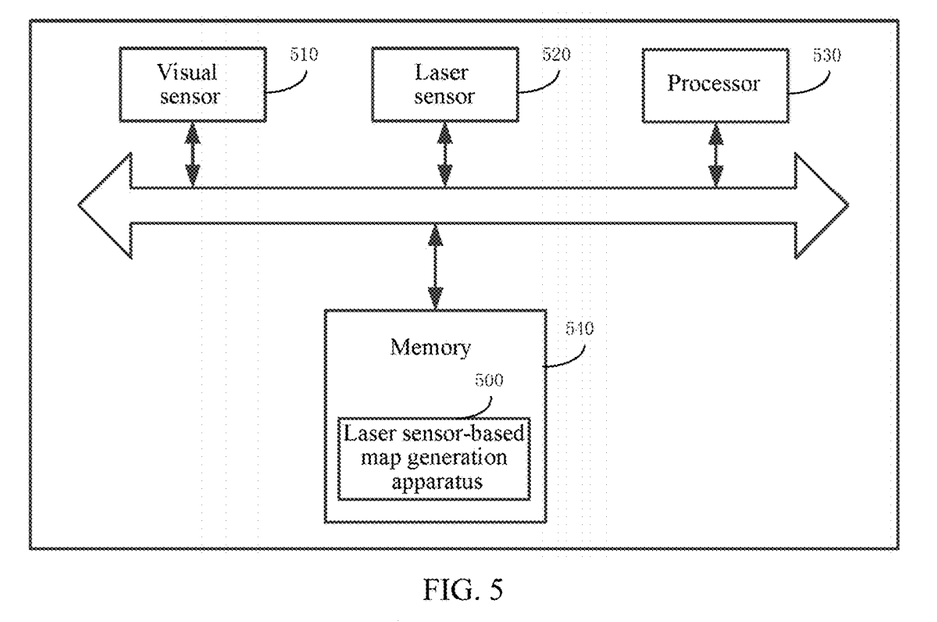
FIG. 5 is a structural diagram of hardware of a mobile device according to an exemplary embodiment of the present disclosure.

The embodiment of the laser sensor-based map generation apparatus in the present disclosure may be applied to a mobile device. The mobile device may be an unmanned vehicle, a robot or the like. The embodiment may be alternatively applied to a server. The server generates a map, and then transmits the map to a robot. The apparatus embodiment may be implemented by software or by hardware or a combination of software and hardware. FIG. 5 is a structural diagram of hardware of a mobile device according to an embodiment of the present disclosure. The mobile device includes a visual sensor 510, a laser sensor 520, a processor 530, a memory 540, and a computer program stored in the memory 540 and executable on the processor 530, the processor 530, when executing the computer program, implementing the laser sensor-based map generation method. In addition to the processor 530 and the memory 540 shown in FIG. 5, the mobile device may include other hardware according to an actual function of generating a map. Details are not described herein.

Figure 6:
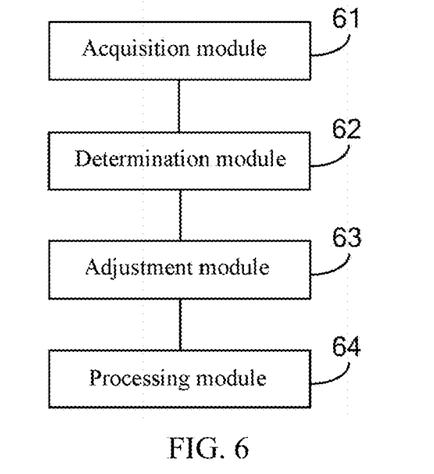
FIG. 6 is a structural block diagram of a laser sensor-based map generation apparatus according to an exemplary embodiment of the present disclosure.

FIG. 6 is a structural block diagram of a laser sensor-based map generation apparatus according to an exemplary embodiment of the present disclosure. The apparatus may be applied to a mobile device having a visual sensor and a laser sensor. As shown in FIG. 6, the apparatus includes an acquisition module 61, a determination module 62, an adjustment module 63, and a processing module 64.

The acquisition module 61 is configured to acquire image data, the image data being acquired by a visual sensor.

The determination module 62 is configured to determine first point cloud data belonging to glass-like region in laser data based on the image data, the laser data being acquired by a laser sensor, the laser data and the image data corresponding to one same region, a time period in which the visual sensor acquires the image data being the same as a time period in which the laser sensor acquires the laser data.

The adjustment module 63 is configured to adjust a weight of the laser data according to the first point cloud data.

The processing module 64 is configured to fuse the first point cloud data and second point cloud data belonging to non-glass-like region in the laser data based on the adjusted weight of the laser data, to generate a map.

Figure 7:
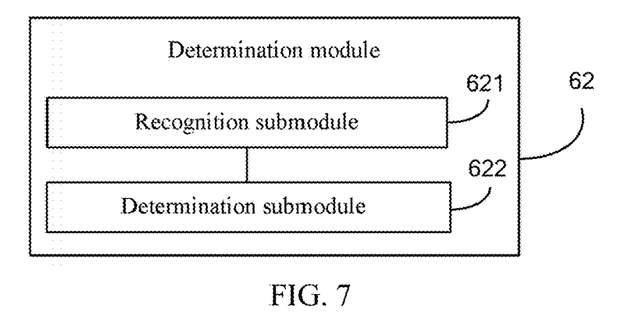
FIG. 7 is a structural block diagram of a laser sensor-based map generation apparatus according to another exemplary embodiment of the present disclosure.

FIG. 7 is a structural block diagram of a laser sensor-based map generation apparatus according to another exemplary embodiment of the present disclosure. As shown in FIG. 7, based on the embodiment shown in FIG. 6, the determination module 62 may include:

a recognition submodule 621, configured to recognize a glass-like region in the image data; and a determination submodule 622, configured to determine the first point cloud data belonging to glass-like region in the laser data according to the glass-like region in the image data recognized by the recognition submodule 621 and a pre-received extrinsic parameter between the visual sensor and the laser sensor. The extrinsic parameter indicates a spatial rotation and translation relationship between a first coordinate system in which the visual sensor is located and a second coordinate system in which the laser sensor is located.

In an embodiment, the recognition submodule 621 is further configured to: segment an image corresponding to the image data into a plurality of subimages; determine, according to one recognition model or a plurality of pre-trained recognition models, whether each subimage belongs to glass-like region; and determine the glass-like region in the image data according to subimages belonging to glass-like region.

In an embodiment, the recognition submodule 621 is further configured to: input the subimage into the recognition model, to obtain a probability of determining, based on the recognition model, that the subimage belongs to glass-like region; and determine, when the probability of determining, based on the recognition model, that the subimage belongs to glass-like region is greater than a probability threshold corresponding to the recognition model, that the subimage belongs to glass-like region.

In an embodiment, the recognition submodule 621 is further configured to: input the subimage into every recognition model, to obtain a probability of determining, based on the recognition model, that the subimage belongs to glass-like region; and determine, when the probability of determining, based on every recognition model, that the subimage belongs to glass-like region is greater than a probability threshold corresponding to the recognition model, that the subimage belongs to glass-like region.

In an embodiment, the recognition submodule 621 is further configured to use the union of the subimages belonging to glass-like region as the glass-like region in the image data.

In an embodiment, the adjustment module 63 is further configured to: decrease a first weight corresponding to the first point cloud data; and/or increase a second weight corresponding to the second point cloud data.

In an embodiment, the adjustment module 63 is further configured to: decrease a confidence level of the first point cloud data; and decrease the first weight according to the decreased confidence level.

In an embodiment, the adjustment module 63 is further configured to: increase a confidence level of the second point cloud data; and increase the second weight according to the increased confidence level.

In an embodiment, the processing module 64 is further configured to: fuse the first point cloud data and the second point cloud data based on the adjusted weight of the laser data, to obtain an initial map; and optimize the initial map to generate the map.

In an embodiment, the processing module 64 is further configured to register the first point cloud data, to generate registered first point cloud data; register the second point cloud data, to generate registered second point cloud data; calculate a cost function based on a coordinate vector of the registered first point cloud data, a coordinate vector of the registered second point cloud data, a decreased first weight corresponding to the registered first point cloud data, an increased second weight corresponding to the registered second point cloud data, and an attitude parameter between the registered point cloud data; optimize the attitude parameter by performing iterative operation on the cost function; and fuse the registered first point cloud data and the registered second point cloud data based on the optimized attitude parameter.

For details about the implementation processes of the functions and effects of the units in the foregoing apparatus, refer to the implementation processes of the corresponding steps in the foregoing method. Details are not described herein again.

In an exemplary embodiment, a computer-readable storage medium is further provided, the storage medium storing a computer program, the computer program, when invoked by a processor, causing the processor to perform the laser sensor-based map generation method. The computer-readable storage medium may include a non-volatile machine-readable storage medium, a read-only memory (ROM), a random access memory (RAM), a compact disc ROM (CD-ROM), a magnetic tape, a floppy disk, and an optical data storage device.

The apparatus embodiment basically corresponds to the method embodiment, and therefore for related parts, reference may be made to partial descriptions in the method embodiment. The described apparatus embodiment is merely an example. The units described as separate parts may or may not be physically separate, and parts displayed as units may or may not be physical units, may be located in one position, or may be distributed on a plurality of network units. Some or all of the modules may be selected according to practical requirements to achieve the objectives of the present disclosure. A person of ordinary skill in the art may understand and implement this embodiment without creative efforts.

The foregoing descriptions are merely exemplary embodiments of the present disclosure, but are not intended to limit the present disclosure. Any modification, equivalent replacement, improvement, or the like made without departing from the spirit and principle of the present disclosure shall fall within the protection scope of the present disclosure.

The invention claimed is:

1. A laser sensor-based map generation method, comprising:

acquiring image data acquired by a visual sensor;

determining first point cloud data belonging to glass-like region in laser data based on the image data, the laser data being acquired by a laser sensor, the laser data and the image data corresponding to one same region, a time period in which the visual sensor acquires the image data being the same as a time period in which the laser sensor acquires the laser data;

adjusting a weight of the laser data according to the first point cloud data; and fusing the first point cloud data and second point cloud data belonging to non-glass-like region in the laser data based on the adjusted weight of the laser data, to generate a map; and, wherein determining first point cloud data in laser data based on the image data comprises:

identifying a glass-like region in the image data; and determining the first point cloud data in the laser data according to the glass-like region in the image data and a pre-received extrinsic parameter between the visual sensor and the laser sensor.

2. The method according to claim 1, wherein adjusting a weight of the laser data according to the first point cloud data comprises any one or more of the following:

decreasing a first weight corresponding to the first point cloud data; or increasing a second weight corresponding to the second point cloud data.

3. The method according to claim 2, wherein decreasing the first weight corresponding to the first point cloud data comprises:

decreasing a confidence level of the first point cloud data; and decreasing the first weight according to the decreased confidence level.

4. The method according to claim 2, wherein increasing the second weight corresponding to the second point cloud data comprises:

increasing a confidence level of the second point cloud data; and increasing the second weight according to the increased confidence level.

5. The method according to claim 1, wherein the extrinsic parameter indicates a spatial rotation and translation relationship between a first coordinate system in which the visual sensor is located and a second coordinate system in which the laser sensor is located.

6. The method according to claim 1, wherein identifying the glass-like region in the image data comprises:

segmenting an image corresponding to the image data into a plurality of subimages;

determining, according to one recognition model pre-trained or a plurality of recognition models pre-trained, whether each of the subimages belongs to glass-like region; and determining the glass-like region in the image data according to subimages belonging to glass-like region.

7. The method according to claim 6, wherein determining, according to the recognition model pre-trained, whether each of the subimages belongs to glass-like region comprises:

inputting the subimage into the recognition model, to obtain a probability of determining, based on the recognition model, that the subimage belongs to glass-like region; and when the probability of determining, based on the recognition model, that the subimage belongs to glass-like region is greater than a probability threshold corresponding to the recognition model, determining that the subimage belongs to glass-like region.

8. The method according to claim 6, wherein determining, according to the plurality of recognition models pre-trained, whether each of subimages belongs to glass-like region comprises:

for each of the plurality of recognition models, inputting the subimage into the recognition model to obtain a probability of determining, based on the recognition model, that the subimage belongs to glass-like region; and when for each of the plurality of recognition models, the probability of determining, based on the recognition model, that the subimage belongs to glass-like region is greater than a probability threshold corresponding to the recognition model, determining that the subimage belongs to glass-like region.

9. The method according to claim 6, wherein determining the glass-like region in the image data according to subimages belonging to glass-like region comprises:

using a combination of the subimages belonging to glass-like region as the glass-like region in the image data.

10. The method according to claim 1, wherein fusing the first point cloud data and second point cloud data based on the adjusted weight of the laser data, to generate the map comprises:

fusing the first point cloud data and the second point cloud data based on the adjusted weight of the laser data, to obtain an initial map; and optimizing the initial map to generate the map.

11. The method according to claim 10, wherein fusing the first point cloud data and second point cloud data based on the adjusted weight of the laser data comprises:

registering the first point cloud data, to generate registered first point cloud data;

registering the second point cloud data, to generate registered second point cloud data;

calculating a cost function based on a coordinate vector of the registered first point cloud data, a coordinate vector of the registered second point cloud data, a decreased first weight corresponding to the registered first point cloud data, an increased second weight corresponding to the registered second point cloud data, and an attitude parameter between registered point cloud data;

optimizing the attitude parameter by performing iterative operation on the cost function; and fusing the registered first point cloud data and the registered second point cloud data based on the optimized attitude parameter.

12. A non-transitory computer-readable storage medium, storing a computer program, the computer program, when invoked by a processor, causing the processor to perform:

acquiring image data acquired by a visual sensor;

determining first point cloud data belonging to glass-like region in laser data based on the image data, the laser data being acquired by a laser sensor, the laser data and the image data corresponding to one same region, a time period in which the visual sensor acquires the image data being the same as a time period in which the laser sensor acquires the laser data;

adjusting a weight of the laser data according to the first point cloud data; and fusing the first point cloud data and second point cloud data belonging to non-glass-like region in the laser data based on the adjusted weight of the laser data, to generate a map;

wherein determining first point cloud data in laser data based on the image data comprises:

identifying a glass-like region in the image data; and determining the first point cloud data in the laser data according to the glass-like region in the image data and a pre-received extrinsic parameter between the visual sensor and the laser sensor.

13. A mobile device, comprising a visual sensor, a laser sensor, a processor, a memory, and a computer program stored in the memory and run on the processor, the processor, when executing the computer program, the processor is caused to perform:

acquiring image data acquired by a visual sensor;

determining first point cloud data belonging to glass-like region in laser data based on the image data, the laser data being acquired by a laser sensor, the laser data and the image data corresponding to one same region, a time period in which the visual sensor acquires the image data being the same as a time period in which the laser sensor acquires the laser data;

adjusting a weight of the laser data according to the first point cloud data; and fusing the first point cloud data and second point cloud data belonging to non-glass-like region in the laser data based on the adjusted weight of the laser data, to generate a map;

wherein determining first point cloud data in laser data based on the image data comprises:

identifying a glass-like region in the image data; and determining the first point cloud data in the laser data according to the glass-like region in the image data and a pre-received extrinsic parameter between the visual sensor and the laser sensor.

* * * * *